(12) United States Patent
Hosaka et al.

(10) Patent No.: US 6,466,744 B1
(45) Date of Patent: Oct. 15, 2002

(54) STROBE CIRCUIT, LENS-FITTED FILM UNIT, CAMERA AND PRINTED-CIRCUIT BOARD FOR STROBE

(75) Inventors: Takao Hosaka, Hino (JP); Kijiro Suzuki, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/656,798

(22) Filed: Sep. 7, 2000

(30) Foreign Application Priority Data

Sep. 7, 1999 (JP) .............................. 11-252839
Jan. 26, 2000 (JP) ....................... 2000-016955

(51) Int. Cl.$^7$ ................. G03B 15/03; G03B 17/18; G03B 17/24
(52) U.S. Cl. .............. 396/155; 396/201; 396/206; 396/311; 396/317
(58) Field of Search ................. 396/155, 205, 396/206, 315, 317, 311, 201, 159

(56) References Cited

U.S. PATENT DOCUMENTS 5,038,080 A * 8/1991 Hirata .................. 315/241 P
5,784,658 A * 7/1998 Hata et al. .................. 396/311

* cited by examiner

Primary Examiner—David Gray
Assistant Examiner—Rochelle Blackman
(74) Attorney, Agent, or Firm—Cantor Colburn LLP

(57) ABSTRACT

There is described a strobe device to which another electronic circuit or electronic element is added, and a lens-fitted film unit and a camera, which incorporates the strobe device. The strobe device includes: a strobe light-emitting tube to emit a strobe light; a main-capacitor coupled in parallel to the strobe light-emitting tube, so as to supply a luminous energy to the strobe light-emitting tube; a trigger-transformer to apply a trigger-voltage to a trigger-electrode of the strobe light-emitting tube; a trigger-section to activate a light-emitting action of the strobe light-emitting tube; a trigger-capacitor, coupled to the main-capacitor with a resistor, to store an electronic charge, which is discharged to the trigger-transformer when the trigger-section turns ON; and a semiconductor element driven by a part of an electronic charge stored in the main-capacitor, when the trigger-section turns ON to activate the light-emitting action of the strobe light-emitting tube.

15 Claims, 13 Drawing Sheets

STROBE CIRCUIT, LENS-FITTED FILM UNIT, CAMERA AND PRINTED-CIRCUIT BOARD FOR STROBE

BACKGROUND OF THE INVENTION

The present invention relates to a strobe circuit, to which another electronic circuit or electronic element is added, and a printed circuit board for strobe, which comprises two circuit boards, and also relates to a lens-fitted film unit and a camera, which incorporates the abovementioned strobe circuit or printed-circuit board for strobe.

Conventionally, quite a few lens-fitted film units, incorporated with a strobe, have been put in the market. FIG. 1 shows an example of the strobe circuit diagram employed for such lens-fitted film units.

In FIG. 1, when main switches $S_1$, $S_2$ are turned ON by an external operation, the electronic current, fed from battery B, flows into transistor $T_R$ through resistor $R_1$ to start the oscillation, by which the high-voltage of 300–350 volts is induced at the secondary winding of oscillation transformer T. The induced electronic current from the secondary winding is rectified by diode D, and the rectified electronic current flows into main-capacitor $C_M$ and trigger-capacitor $C_T$, serially connected with resistor $R_1$, to charge them. When main-capacitor $C_M$ is charged to a predetermined voltage, light-emitting diode $D_L$, serially connected with resistor $R_2$, emits light.

When capturing image, trigger-switch $S_T$ turns ON in conjunction with the opening operation of shutter blinds. Then, the closed circuit, including trigger-capacitor $C_T$, trigger-switch $S_T$, the primary winding of trigger-transformer $T_C$ and main switches $S_1$, $S_2$, is formed to discharge the electronic charge stored in trigger-capacitor $C_T$. As a result, the further high-voltage is induced in the secondary winding of trigger-transformer $T_C$, and the induced high-voltage is applied to the trigger-electrode of xenon tube Xe, in which electrons, isolated from the cathode, impinge with ionized xenon atoms to excite the xenon atoms. Thus, xenon tube Xe emits the strobe light associating with the discharging action of main-capacitor $C_M$.

Since it is a primary subject for the lens-fitted film unit to reduce its price as low as possible, it is difficult to equip various kinds of image capturing mechanisms in it. Nevertheless, consumers desire that more image capturing mechanisms are incorporated in the lens-fitted film unit, in order to enjoy the image capturing with better photographic images.

Although quite a few lens-fitted film units, incorporated with a strobe circuit, have been put in the market as aforementioned, the strobe circuit is utilized only for activating the strobe lighting in such lens-fitted film units, as a matter of course. The parts, included in the strobe circuit, however, are relatively expensive, and the battery and the main-capacitor require large spaces. Therefore, it has been quite wasteful for lens-fitted film units to limit the purpose of the strobe circuit within the strobe lighting.

To utilize the strobe circuit more efficiently, it may be possible to incorporate new electronic element and/or electronic circuit, having a certain added value, in the strobe circuit. Such new electronic element or electronic circuit, however, usually requires a separate power source, which extraordinarily raises the total cost of the apparatus concerned. This problem is specifically serious for the strobe device of the lens-fitted film unit, the price of which should be reduced as low as possible.

SUMMARY OF THE INVENTION

To overcome the abovementioned drawbacks in conventional strobe devices, it is the first object of the present invention to provide a strobe device, which makes it possible to equip a new function in the strobe device by adding a little electronic circuit or some electronic parts to the fundamental circuit for strobe lighting.

Further, sometimes, it is difficult to mount an added circuit, having a new photographic function, on the small sized printed circuit board, which already mounts parts for the fundamental circuit for strobe lighting. To solve this problem, the second object of the present invention is to provide a combination of two printed circuit boards, strictly coupled to each other, which is disposed in a vacant space of a lens-fitted film unit or a camera.

Accordingly, to overcome the cited shortcomings, the abovementioned objects of the present invention can be attained by a strobe device, a lens-fitted film unit and a camera described as follow.

(1) A strobe device, comprising: a strobe light-emitting tube to emit a strobe light; a main-capacitor coupled in parallel to the strobe light-emitting tube, so as to supply a luminous energy to the strobe light-emitting tube; a trigger-transformer to apply a trigger-voltage to a trigger-electrode of the strobe light-emitting tube; a trigger-section to activate a light-emitting action of the strobe light-emitting tube; a trigger-capacitor, coupled to the main-capacitor with a resistor, to store an electronic charge, which is discharged to the trigger-transformer when the trigger-section turns ON; and an operating section driven by a part of an electronic charge, stored in the main-capacitor, flowing through the resistor when the trigger-section turns ON to activate the light-emitting action of the strobe light-emitting tube.

(2) The strobe device of item 1, wherein a closed circuit, serially connecting the trigger-capacitor, the trigger-section and a primary winding of the trigger-transformer, is formed when the trigger-section turns ON, and simultaneously, another closed circuit, serially connecting the main-capacitor, the operating section, the resistor, the trigger-section and the primary winding of the trigger-transformer, is formed.

(3) The strobe device of item 1, wherein the operating section is a constant-voltage generating element.

(4) The strobe device of item 3, wherein the constant-voltage generating element is a zener diode.

(5) The strobe device of item 4, wherein an anode of the zener diode is coupled to a negative pole of the main-capacitor.

(6) The strobe device of item 3, wherein an added circuit, which is driven by a voltage-source generated by the constant-voltage generating element, is coupled in parallel to the constant-voltage generating element.

(7) The strobe device of item 6, wherein the added circuit is a light-intensity regulating circuit, which controls an amount of the strobe light emitted from the strobe device, in response to an amount of the strobe light reflected from a subject.

(8) The strobe device of item 7, further comprising: a first printed circuit board on which electronic parts, constituting a fundamental circuit for a strobe lighting, including at least a voltage-boosting circuit, a charging circuit and a illumination circuit, are mounted; and a second printed circuit board on which electronic parts, constituting an electronic circuit other than the fundamental circuit, are mounted, wherein the first printed circuit board and the second printed circuit board are coupled to each other by means of a conductive member having an electronic conductivity, and the light-intensity regulating circuit is equipped on the second printed circuit board.
(9) The strobe device of item 8, wherein the first printed circuit board and the second printed circuit board are coupled to each other by means of at least the two conductive members.
(10) The strobe device of item 1, wherein the operating section is a light-emitting diode.
(11) The strobe device of item 10, wherein a cathode of the light-emitting diode is coupled to a negative pole of the main-capacitor.
(12) A lens-fitted film unit equipped with a strobe device, comprising: a main-body; a photographic lens; a shutter; and a photographic film loaded in the main-body, wherein the strobe device comprises, a strobe light-emitting tube to emit a strobe light, a main-capacitor coupled in parallel to the strobe light-emitting tube, so as to supply a luminous energy to the strobe light-emitting tube, a trigger-transformer to apply a trigger-voltage to a trigger-electrode of the strobe light-emitting tube, a trigger-section to activate a light-emitting action of the strobe light-emitting tube, a trigger-capacitor, coupled to the main-capacitor with a resistor, to store an electronic charge, which is discharged to the trigger-transformer when the trigger-section turns ON, and an operating section driven by a part of an electronic charge, stored in the main-capacitor, flowing through the resistor when the trigger-section turns ON to activate the light-emitting action of the strobe light-emitting tube.
(13) The lens-fitted film unit of item 12, wherein the trigger-section turns ON in conjunction with a opening action of the shutter.
(14) The lens-fitted film unit of item 12, wherein the operating section is a light-emitting diode, and a print type of a captured image is selectable by a photographer in the lens-fitted film unit, and the light-emitting diode exposes a mark, corresponding to the print type selected by the photographer, on an unexposed area, outside a photographic image area, of the photographic film.
(15) The lens-fitted film unit of item 12, further comprising: a power source to supply an electronic power to the strobe device, the power source is a battery of 1–2 volt.
(16) A camera equipped with a strobe device, comprising: a photographic lens; and a shutter, wherein the strobe device comprises, a strobe light-emitting tube to emit a strobe light, a main-capacitor coupled in parallel to the strobe light-emitting tube, so as to supply a luminous energy to the strobe light-emitting tube, a trigger-transformer to apply a trigger-voltage to a trigger-electrode of the strobe light-emitting tube, a trigger-section to activate a light-emitting action of the strobe light-emitting tube, a trigger-capacitor, coupled to the main-capacitor with a resistor, to store an electronic charge, which is discharged to the trigger-transformer when the trigger-section turns ON, and an operating section driven by a part of an electronic charge, stored in the main-capacitor, flowing through the resistor when the trigger-section turns ON to activate the light-emitting action of the strobe light-emitting tube.
(17) The camera of item 16, wherein the trigger-section turns ON in conjunction with a opening action of the shutter.
(18) The camera of item 16, wherein the operating section is a light-emitting diode, and a print type of a captured image is selectable by a photographer in the camera, and the light-emitting diode exposes a mark outside a photographic image area of an unexposed film, corresponding to the print type selected by the photographer.

Further, to overcome the abovementioned problems, other strobe devices, lens-fitted film units and cameras, embodied in the present invention, will be described as follow:
(19) A strobe circuit, characterized in that the strobe circuit is provided with a xenon tube to emit a strobe light; a main-capacitor coupled in parallel to the xenon tube,-so as to supply a high-voltage energy to the xenon tube; a trigger-transformer to apply a high-voltage to a trigger-electrode of the xenon tube; a trigger-capacitor, coupled to the main-capacitor with a resistor so as to charge an electronic charge, which discharges the electronic charge to the trigger-transformer when the trigger-means turns ON; and an operating means driven by a part of an electronic charge of the main-capacitor, flowing through the resistor when the xenon tube emits light by turning the trigger-means ON.
(20) A strobe circuit, characterized in that the strobe circuit is provided with a xenon tube to emit a strobe light; a main-capacitor coupled in parallel to the xenon tube, so as to supply a high-voltage energy to the xenon tube; a trigger-switch, which turns ON in conjunction with an opening action of a shutter blind; a trigger-transformer to apply a high-voltage to a trigger-electrode of the xenon tube; a trigger-capacitor, coupled to the main-capacitor with a resistor so as to charge an electronic charge, which discharges the electronic charge to the trigger-transformer when the trigger-means turns ON; and an operating means, wherein a closed circuit, serially connecting the trigger-capacitor, the trigger-switch and a primary winding of the trigger-transformer, is formed when the trigger-section turns ON, and simultaneously, another closed circuit, serially connecting the main-capacitor, the operating means, the resistor, the trigger-switch and the primary winding of the trigger-transformer, is formed, in order to drive the operating means by flowing a part of the electronic charge of the main-capacitor into the operating means.
(21) The strobe circuit of item 19 or 20, characterized in that the operating-means is a light-emitting diode, a cathode of which is coupled to a negative pole of the main-capacitor.
(22) A lens-fitted film unit, characterized in that the lens-fitted film unit is provided with the strobe device described in item 21, and the light-emitting diode emits light to conduct an exposing action at outside of an image area of an unexposed film, corresponding to a print type selected by a photographer.
(23) A camera, characterized in that the camera is provided with the strobe device described in item 21, and the light-emitting diode emits light to conduct an exposing action at outside of an image area of an unexposed film, corresponding to a print type selected by a photographer.
(24) The strobe circuit of item 19 or 20, characterized in that the operating means is a zener diode, an anode of which is coupled to a negative pole of the main-capacitor.
(25) The strobe circuit of item 24, characterized in that an added circuit, which is driven by a voltage generated by the zener diode, is coupled in parallel to the zener diode.
(26) The strobe circuit of item 25, characterized in that the added circuit is a light-intensity regulating circuit, which controls an amount of the strobe light emitted from the strobe device, in response to an amount of the strobe light reflected from a subject.
(27) A lens-fitted film unit, characterized in that the lens-fitted film unit is provided with the strobe circuit described in item 26.

(28) A camera, characterized in that the camera is provided with the strobe circuit described in item 26.

(29) A printed circuit board for strobe lighting, characterized in that the printed circuit board comprises a first printed circuit board on which electronic parts, constituting a fundamental circuit for a strobe lighting, including at least a voltage-boosting circuit, a charging circuit and a illumination circuit, are mounted; and a second printed circuit board on which electronic parts, constituting an electronic circuit other than the fundamental circuit, are mounted, wherein the first printed circuit board and the second printed circuit board are coupled to each other by means of at least two conductive members having an electronic conductivity.

(30) The printed circuit board, for strobe lighting, of item 29, characterized in that the light-emitting diode, in the strobe circuit described in item 21, is mounted on the second printed circuit board.

(31) The printed circuit board, for strobe lighting, of item 29, characterized in that the light-intensity regulating circuit, in the strobe circuit described in item 26, is equipped on the second printed circuit board.

(32) A lens-fitted film unit, characterized in that the printed circuit board, for strobe lighting, of item 29, is equipped in the lens-fitted film unit.

(33) A camera, characterized in that the printed circuit board, for strobe lighting, of item 29, is equipped in the camera.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 8:
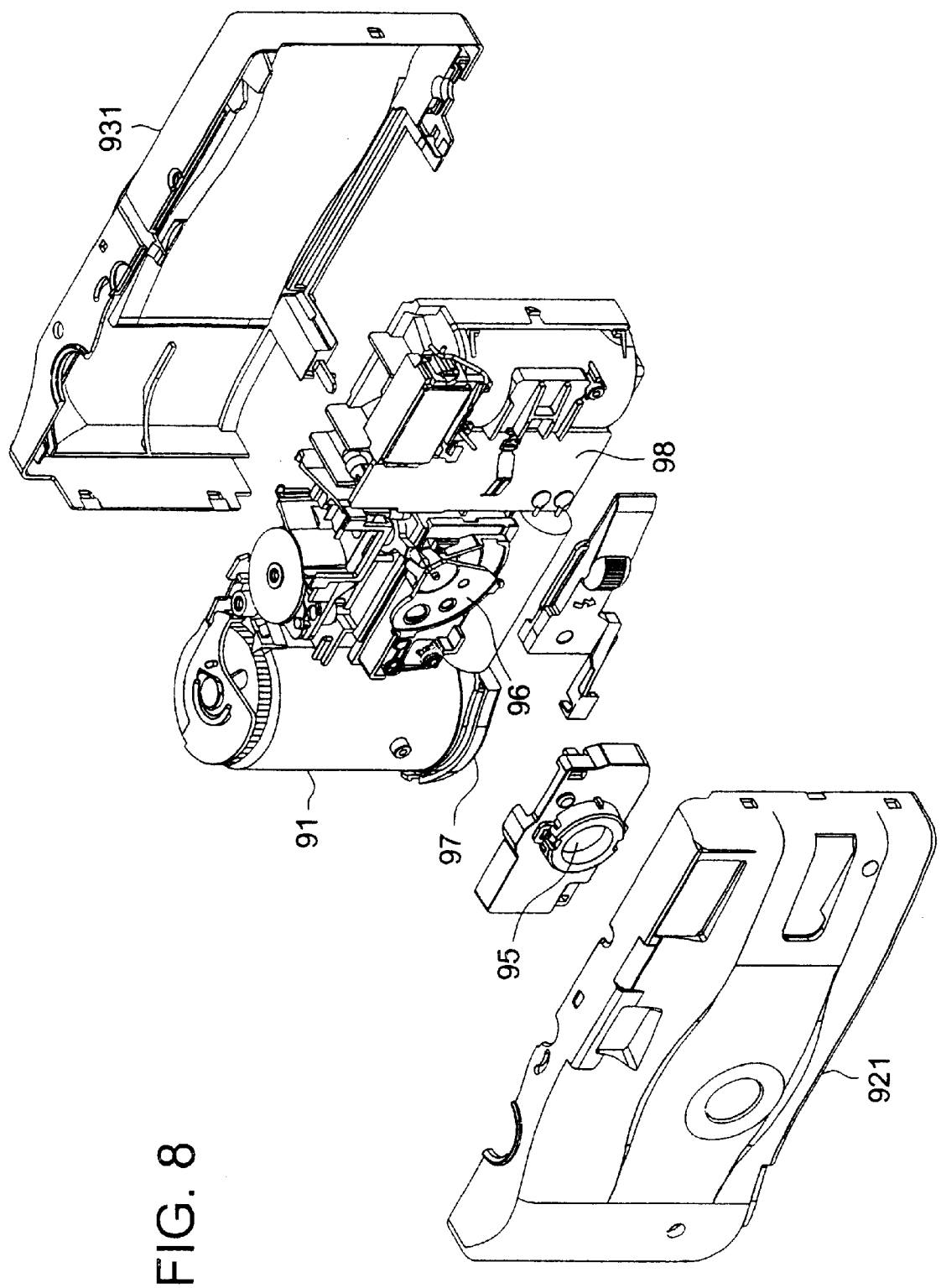
FIG. 8 shows an exploded perspective view of the lens-fitted film unit.

Initially, the configuration of the lens-fitted film unit will be detailed in the following. FIG. 8 shows an exploded perspective view of the lens-fitted film unit. As shown in FIG. 8, the lens-fitted film unit is comprised of unit main-body 91, front cover 921, rear cover 931, photographic lens 95, shutter unit 96, etc. Shutter unit 96, photographic lens 95, etc. are mounted in unit main-body 91, which is covered with front cover 921 and rear cover 931. Further, unit main-body 91 comprises an exposed film chamber in which a film magazine is accommodated.

Further, the lens-fitted film unit comprises a strobe device for capturing images with strobe lighting. The strobe device, embodied in the present invention, comprises a light-emitting tube to emit a strobe light, a main-capacitor coupled to the light-emitting tube in parallel so as to supply a light emitting energy to the light-emitting tube, a trigger-transformer to apply a trigger-voltage onto the trigger-electrode of the light-emitting tube, a trigger-means, resistors, a trigger-capacitor connected to the main-capacitor through the resistor to discharge an electric charge into the trigger-transformer when the trigger-means turns ON, and an operating section (operating means) driven by a part of the electric charge stored in the main-capacitor, which flows through the resistor at the time of the strobe lighting when the trigger-means turns ON.

Incidentally, the term of "strobe device" will be also referred to as "strobe circuit" in the following description. It is desirable that the light emitting energy, supplied to the light-emitting tube by the main-capacitor, is the high-voltage energy. In addition, it is also desirable that the trigger-voltage, applied to the trigger-electrode by the trigger-transformer, is the high-voltage.

Further, a xenon tube can be referred to a typical example of the light-emitting tube, while a trigger-switch, a thyristor and a transistor can be referred to desirable and concrete examples of the trigger-means. In addition, it is desirable that the trigger-means turns ON in conjunction with the opening operation of the shutter.

Still further, as for concrete examples of the operating means, which is detailed later, a zener diode, serving as a constant-voltage generating element, and a light-emitting diode can be referred to desirable examples of it. In case of employing the constant-voltage generating element such as a zener diode, etc., when the constant voltage is generated at both terminals of the constant voltage generating element by the electronic current flowing in it, the operating means is regarded as entering in the activated state. Incidentally, the constant-voltage generating element, defined in the present invention, does not necessarily generate a strictly constant voltage with little margin, but generates a substantially constant voltage within a predetermined voltage range. Concretely, it is desirable that a fluctuation of the voltage is in a range of ±10% of its nominal voltage. Therefore, the zener diode is sufficiently applicable for the strobe device, embodied in the present invention. It is desirable that the anode of the zener diode is coupled to the negative electrode of the main-capacitor. In case of employing the light-emitting diode as the operating means, when the light is emitted from the light-emitting diode by the electronic current flowing in it, the operating means is regarded as entering in the activated state. It is desirable that the cathode of the light-emitting diode is coupled to the negative electrode of the main-capacitor.

Still further, in case of employing the constant-voltage generating element as the operating means, it is applicable that an added circuit, driven by the voltage source generated by the constant-voltage generating element, is coupled to it in parallel. As for a concrete example of the added circuit, a light-intensity regulating circuit, which controls the intensity of the strobe light, emitted from the strobe device, in response to an amount of strobe light reflect from the subject, to be detailed later, can be referred to the added circuit.

Still further, when the trigger-means turns ON, it is desirable that the closed circuit, serially connecting the trigger-capacitor, the trigger-switch, and the primary winding of the trigger-transformer, is formed, and, at the same time, the closed circuit, serially connecting the main-capacitor, the operating means, the resistor, the trigger-switch and the primary winding of the trigger-transformer, is formed.

Still further, the lens-fitted film unit further comprises a power source to supply electronic power to the strobe device. It is desirable that the power source is a battery of 1–2 volt, and specifically desirable a dry battery of 1.5 volt. According to the strobe device, embodied in the present invention, even if the operating means, having a certain added value, is equipped in the strobe device, it is possible to supply a driving energy to the operating means merely by utilizing the normal power source such as a dry battery of 1–2 volt, employed for conventional strobe devices, without employing another power source for the operating means. Therefore, it becomes possible to provide a strobe device of high added value and low cost.

Furthermore, it is also applicable that the strobe device, embodied in the present invention, comprises a first printed board on which electronic parts, constituting basic strobe-electronic circuits to perform at least the voltage boosting, the electronic charging and the light emitting, are mounted, and a second printed board on which electronic parts, constituting electronic circuits other than the basic strobe-electronic circuits, are mounted. In the above strobe device, the first printed board and the second printed board are coupled to each other by a conductive member having conductivity, and the light-intensity regulating circuit is equipped on the second printed board. It is desirable that the voltage-boosting circuit and the light-emitting circuit are equipped on the first printed board, and, in this case, the first printed board and the second printed board are coupled to each other by at least two conductive members. According to the configuration mentioned above, a predetermined electronic circuit can be easily added to the basic strobe-electronic circuits, in order to grade up the function of the apparatus concerned. Therefore, it becomes possible to easily manufacture plural kinds of strobe devices without providing many manufacturing lines and without a lot of man-hours for management, even if plural kinds of strobe devices are manufactured in an independent site.

Incidentally, the present invention is not only applicable for the lens-fitted film unit, but also applicable for all fields of strobe devices, of course, including a camera incorporated with the strobe device and a digital camera incorporated with the strobe device.

Next, referring to drawings, two types of the strobe circuits, embodied in the present invention, will be detailed in the following.

At first, the strobe circuit, which employs the light-emitting diode for the operating means, will be detailed as a first embodiment of the present invention. Then, the strobe circuit, which employs the constant-voltage generating element (the zener diode) for the operating means, and comprises the light-intensity regulating circuit, will be detailed as a second embodiment of the present invention.

[The First Embodiment]

In the first embodiment, a light source for discriminating a type of print is added to the strobe device.

The IX240 film is so constituted that aspect ratios of photographic prints, namely, the three print types including C, H, P, are selectable, when capturing and printing images. Type H represents a print type having a Hi-Vision size of slightly long sideways and the largest negative image area. Type C represents a print type having a conventional size, which is similar to the standard image area of the 135 film, formed by excluding both right and left edge portions of the type H negative image area. Type P represents a print type having a panorama size, whose sideways are extraordinarily long, formed by excluding both upper and lower edge portions of the type H negative image area.

For instance, when the user selects the print type-after loading the IX240 film in the camera, the user selects anyone of types C, H, P by externally operating the camera. Then, the viewing area of the selected print type is displayed in the finder, and the selected print type is recorded on the film outside the photographic image area, in response to shutter release action of the user. This recording action is achieved by either a magnetic-recording method when the camera comprises a magnetic-recording head, or an optical-recording method when the camera does not comprise the magnetic-recording head.

As for a lens-fitted film unit in which the IX240 film is loaded and one of print types C, H, P is selectable, it is desirable that an optical-recording method is employed from a viewpoint of its cost performance.

Referring FIG. 2(a), FIG. 2(b), FIG. 2(c), FIG. 3(a), FIG. 3(b) and FIG. 3(c), an example of the abovementioned optical-recording method, by which one of print types C, H, P is recorded on the IX240 film, is detailed in the following.

Figure 2A:
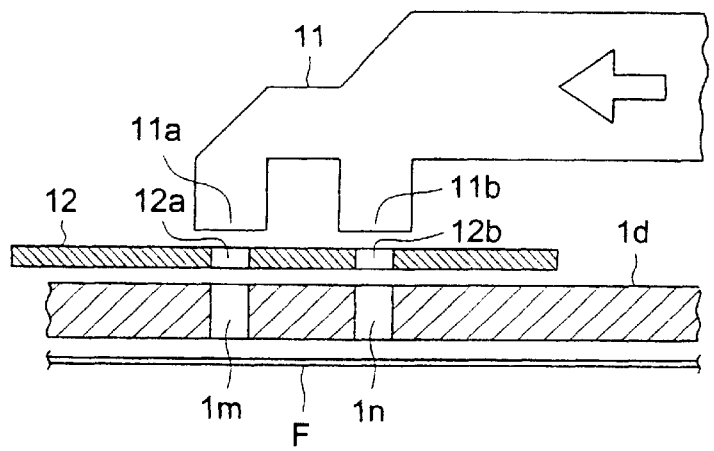
FIG. 2(a), FIG. 2(b) and FIG. 2(c) show enlarged cross-sectional views of a recording section, which records a selected print type on the IX240 film.
Figure 2B:
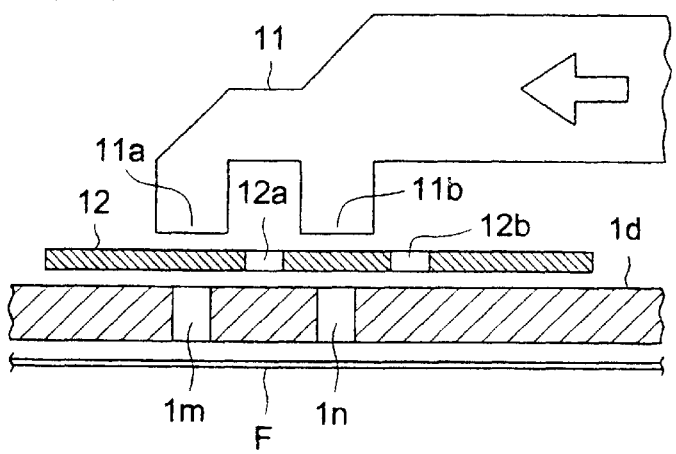
Figure 2C:
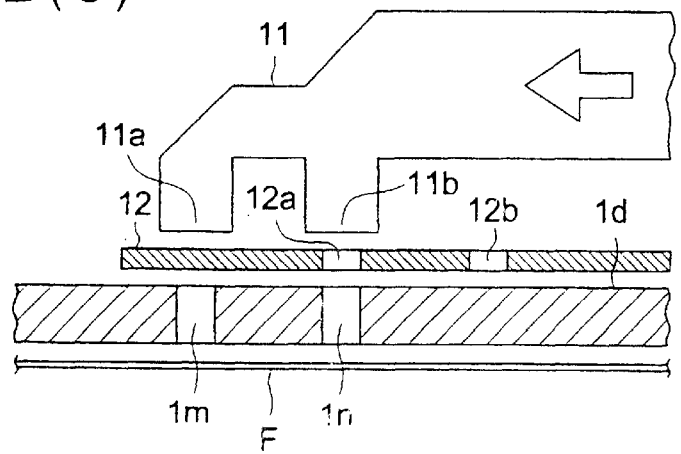
Figure 3:
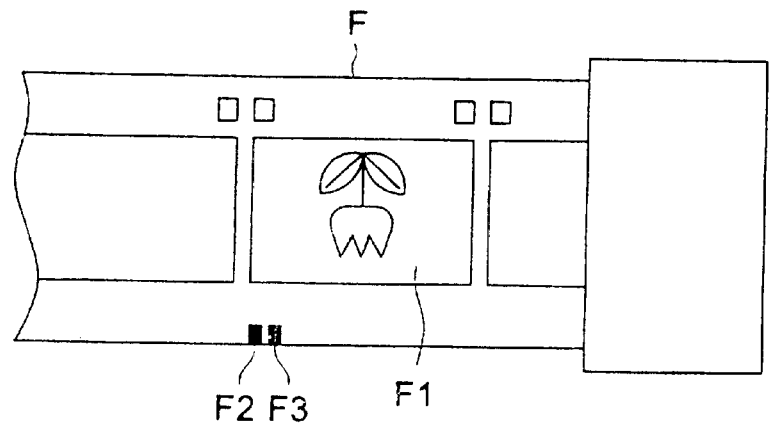
FIG. 3(a), FIG. 3(b) and FIG. 3(c) show views of the IX240 film, on which images are recorded corresponding to the selected print type.
Figure 3:
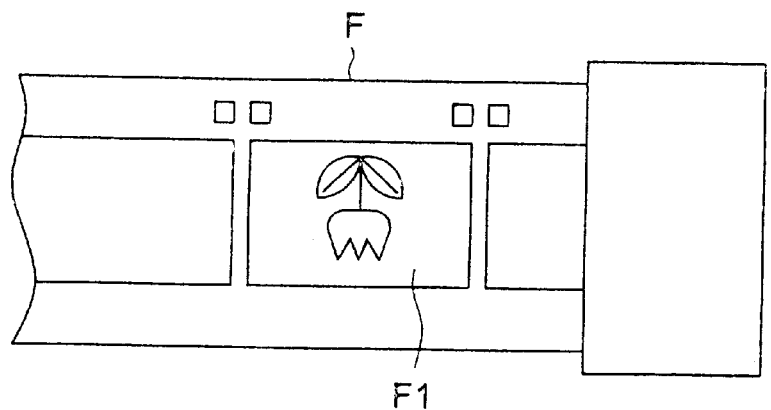
Figure 3:
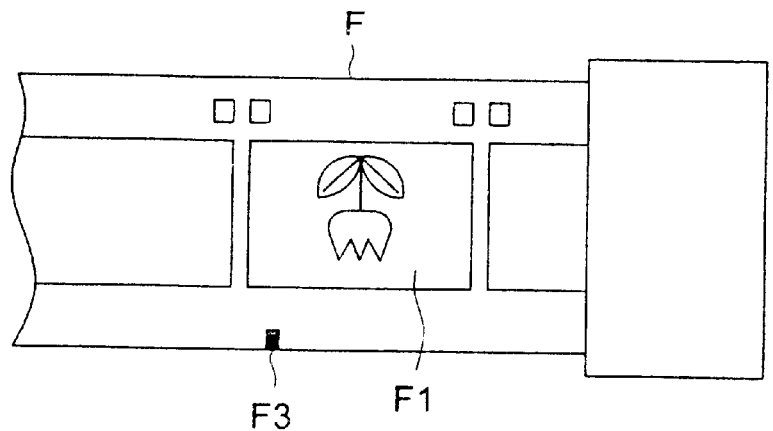

FIG. 2(a), FIG. 2(b) and FIG. 2(c) show enlarged cross-sectional views of a recording section, which records the selected print type on the IX240 film, and specifically, FIG. 2(a), FIG. 2(b) and FIG. 2(c) corresponds to selection of type C, selection of type H and selection of type P, respectively. FIG. 3(a), FIG. 3(b) and FIG. 3(c) show views of the IX240 film, on which images are recorded corresponding to the selected print type, and specifically, FIG. 3(a), FIG. 3(b) and FIG. 3(c) corresponds to selection of type C, selection of type H and selection of type P, respectively.

In FIG. 2(a), FIG. 2(b) and FIG. 2(c), numeral 11 indicates a light guide, made of transparent acrylic acid resin, etc., to guide a light emitted from a light-emitting diode located at right side (not shown in the drawings) in the direction indicated by the arrow. Therefore, the light emitted from the light-emitting diode is finally emitted from light-emitting terminals 11a, 11b. Numeral 12 indicates a shading plate, which has two through-holes 12a, 12b and slides in its longitudinal directions (both right and left directions), corresponding to the selecting operation of the user. Numeral 1d indicates a sidewall of the unit main-body equipped with various kinds of photographic functions, and sidewall 1d has two through-holes 1m, 1n located opposite light-emitting terminals 11a, 11b. The IX240 film (hereinafter, referred to as film F) is positioned at the rear side of sidewall 1d.

When the user selects type C, as shown in FIG. 2(a), shading plate 12 slides to such a position that through-holes 12a, 12b are located opposite light-emitting terminals 11a, 11b of the light guide 11 and through-holes 1m, 1n of sidewall 1d. Accordingly, the light emitted from light-emitting terminals 11a, 11b exposes film F after traveling through through-holes 12a, 12b and through-holes 1m, 1n. Then, as shown in FIG. 3(a), two marks F2 and F3 are exposed outside photographic image F1 on film F.

When the user selects type H, as shown in FIG. 2(b), shading plate 12 slides to such a position that through-holes 12a, 12b are located apart from light-emitting terminals 11a, 11b of the light guide 11 and through-holes 1m, 1n of sidewall 1d. Accordingly, the light emitted from light-emitting terminals 11a, 11b is shaded by shading plate 12. Then, as shown in FIG. 3(b), no mark is exposed on film F.

When the user selects type P, as shown in FIG. 2(c), shading plate 12 slides to such a position that through-hole 12a is located opposite light-emitting terminal 11b of the light guide 11 and through-hole in of sidewall 1d. Accordingly, the light emitted from light-emitting terminal 11b exposes film F after traveling through through-hole 12a and through-hole 1n, while the light emitted from light-emitting terminal 11a is shaded by shading plate 12. Then, as shown in FIG. 3(c), only mark F3 is exposed outside photographic image F1 on film F.

As a result, it becomes possible to discriminate the print type selected by the user when printing photographic images, by either determining type C when two marks F2, F3 are exposed outside photographic image F1 on film F, determining type H when no mark is exposed on film F or determining type P when only mark F3 is exposed outside photographic image F1 on film F, even if the size of photographic image F1 is always that of type H.

Next, referring to FIG. 4, a strobe circuit, which incorporates the abovementioned light-emitting diode, will be detailed in the following.

Figure 4:
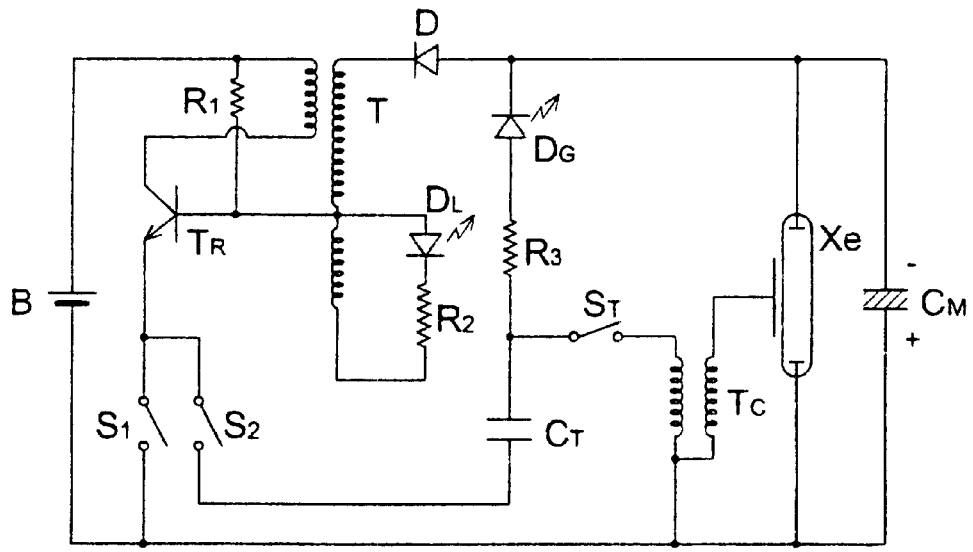
FIG. 4 shows a strobe circuit of the first embodiment.

In FIG. 4, when main switches $S_1$, $S_2$ are turned ON by an external operation, the electronic current, fed from battery B, flows into transistor $T_R$ through resistor $R_1$ to start the oscillation, by which a high-voltage is induced at the secondary winding of oscillation transformer T. The induced electronic current from the secondary winding is rectified by diode D to obtain the high-voltage of 300–350 volts, and the rectified electronic current flows into main-capacitor $C_M$ and trigger-capacitor $C_T$, serially connected with resistor $R_3$, to charge them. When main-capacitor $C_M$ is charged to a predetermined voltage, light-emitting diode $D_L$, serially connected with resistor $R_2$, emits light.

When capturing image, trigger-switch $S_T$ turns ON in conjunction with the opening operation of shutter blinds. Then, the closed circuit, serially connecting trigger-capacitor $C_T$, trigger-switch $S_T$, the primary winding of trigger-transformer $T_C$ and main switches $S_1$, $S_2$, is formed to discharge the electronic charge, stored in trigger-capacitor $C_T$, into the primary winding of trigger-transformer $T_C$. As a result, the further high-voltage is induced in the secondary winding of trigger-transformer $T_C$, and the induced high-voltage is applied to the trigger-electrode of xenon tube Xe, in which electrons, isolated from the cathode, impinge with ionized xenon atoms to excite the xenon atoms. Thus, xenon tube Xe emits the strobe light associating with the discharging action of main-capacitor $C_M$.

On the other hand, when trigger-switch $S_T$ turns ON, another closed circuit, serially connecting main-capacitor $C_M$, light-emitting diode $D_G$, resistor $R_3$, trigger-switch $S_T$ and the primary winding of trigger-transformer $T_C$, is formed, at the same time when the abovementioned closed circuit, including trigger-capacitor $C_T$, is formed.

Accordingly, when trigger-switch $S_T$ turns ON, a part of electronic charge, stored in main-capacitor $C_M$, flows into resistor $R_3$ through the primary winding of trigger-transformer $T_C$ and trigger-switch $S_T$, resulting in electronic current $i_1$. Further, after trigger-capacitor $C_T$ is discharged, a part of electronic charge, stored in main-capacitor $C_M$, also flows into resistor $R_3$, so as to charge trigger-capacitor $C_T$, resulting in electronic current $i_2$. Since the cathode of light-emitting diode $D_G$ is coupled to the negative pole of main-capacitor $C_M$ and the anode of light-emitting diode $D_G$ is serially coupled to resistor $R_3$, electronic current $i_0$, which is equal to $i_1+i_2$, flows into light-emitting diode $D_G$, resulting in a light emission from light-emitting diode $D_G$. Thus, it is possible to utilize the light, emitted from light-emitting diode $D_G$, for optical-recording of the marks on the film, in order to discriminate the print type of the photographic image.

Incidentally, electronic current $i_1$ is greater than electronic current $i_2$, while the luminous duration time of light-emitting diode $D_G$ is shorter than the duration time of ON state of trigger-switch $S_T$, and is around 500 μsec., which is substantially equivalent to the luminous duration time of xenon tube Xe.

Further, it is also applicable that two light-emitting diodes $D_G$ are serially connected in the abovementioned strobe circuit, and two light guides are provided for guiding a light of each light-emitting diode $D_G$, as a individual light guide, instead of light guide 11 shown in FIGS. 2(a), 2(b) and 2(c).

[The Second Embodiment]

In the second embodiment, the light-intensity regulating circuit, which regulates a luminous duration time of the xenon tube in response to the intensity of returned strobe light reflected from the subject, is added to the strobe circuit. As a result, since the strobe lighting is stopped within a short duration time when the subject is near the strobe device, it is possible to prevent occurrences of such conventional photographic images, in which an image of subjective person is excessively bright, while its background is almost black.

Referring to the electronic circuit diagram shown in FIG. 5, the strobe circuit with the light-intensity regulating circuit will be detailed in the following.

Figure 5:
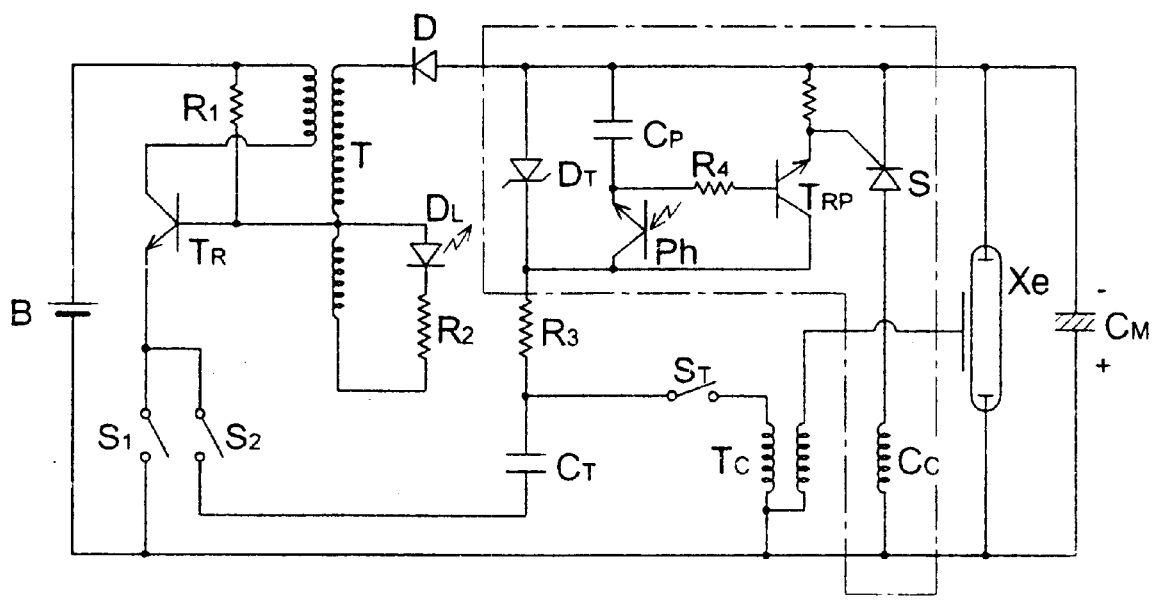
FIG. 5 shows a strobe circuit of the second embodiment.

In FIG. 5, since the electronic circuit other than the circuit surrounded by the chain line is the same as that of the first embodiment, the explanation for them is omitted. As is similar to the first embodiment, when trigger-switch $S_T$ turns ON, a part of electronic charge, stored in main-capacitor $C_M$, flows into resistor $R_3$ through the primary winding of trigger-transformer $T_C$ and trigger-switch $S_T$, resulting in electronic current $i_1$. Further, after trigger-capacitor $C_T$ is discharged, a part of electronic charge, stored in main-capacitor $C_M$, also flows into resistor $R_3$, so as to charge trigger-capacitor $C_T$, resulting in electronic current $i_2$. In the second embodiment, since the anode of zener diode $D_T$ is coupled to the negative pole of main-capacitor $C_M$ and the cathode of zener diode $D_T$ is serially coupled to resistor $R_3$, electronic current $i_0$, which is equal to $i_1+i_2$, flows into zener diode $D_T$.

Capacitor $C_P$ is serially coupled to photo-sensor Ph, and zener diode $D_T$ is coupled to them in parallel. The connected point of capacitor $C_P$ and photo-sensor Ph is coupled to the base of transistor $T_{RP}$ with resistor R4, while the emitter of transistor $T_{RP}$ is coupled to the gate of thyristor S. Thyristor S is serially coupled to choke-coil $C_C$, serving as a current dumper, and xenon tube Xe is coupled to them in parallel.

Accordingly, when thyristor S turns ON, the electronic charge stored in main-capacitor $C_M$ rushes into choke-coil $C_C$ with an electronic current far greater than that of flowing into xenon tube Xe to consume the electronic charge in choke-coil $C_C$, resulting in deactivation of the illumination of xenon tube Xe. Incidentally, it is desirable that the inductance of choke-coil $C_C$ is in a range of 2–20 μH and the peak current, flowing into choke-coil $C_C$, is in a range of 5–10 times of the current flowing into xenon tube Xe.

When a zener voltage is generated between both terminals of zener diode $D_T$ by electronic current $i_0$ flowing into zener diode $D_T$, an electronic current, corresponding to the intensity of light reflected from the subject, flows in photo-sensor Ph. When the subject is near the strobe device, the intensity of light reflected from the subject becomes large value, and thereby, a large amount of electronic current flows in photo-sensor Ph. As a result, capacitor $C_P$ is rapidly charged. On the other hand, when the subject is far from the strobe device, the intensity of light reflected from the subject becomes small value, and thereby, a small amount of electronic current flows in photo-sensor $D_T$. As a result, capacitor $C_P$ is slowly charged.

Accordingly, when capturing the subject located at near distance, since transistor $T_{RP}$ rapidly turns ON to activate thyristor S, choke-coil $C_C$ rapidly consumes the electronic charge stored in main-capacitor $C_M$ in mid-course of illuminating action of xenon tube Xe. As a result, the illuminating action of xenon tube Xe is stopped within a shorter luminous duration time. On the other hand, when capturing the subject located at far distance, since transistor $T_{RP}$ slowly turns ON to activate thyristor S, the illuminating action of xenon tube Xe is stopped within a longer luminous duration time. Therefore, it is possible to regulate the exposure value within a substantially constant value, irrespective of the object distance, since the intensity of light reflected from the subject varies corresponding to the object distance, and thereby, the total luminous amount of strobe device varies, even if the aperture is fixed.

Although the strobe circuits added with the light source for discriminating the print type and added with the light-intensity regulating circuit are described as embodiments of the present invention in the above, the scope of the present invention is not limited to the abovementioned embodiments. For example, a power saving strobe circuit having a function of automatically stopping charging-action, a counter circuit for counting number of times of strobe lighting, which is referred to recycling of the strobe device, and a date exposing circuit for exposing date on the photographic image can be also driven by the zener voltage generated between both terminals of the zener diode.

Further, the abovementioned circuits can be mounted on a printed-circuit board, which is incorporated in lens-fitted film units or cameras.

Incidentally, lens-fitted film units or cameras, recently put in the market, are formed in very small size, and therefore, printed-circuit boards, utilized for the strobe devices, are also formed in very small size. Accordingly, sometimes, it is difficult to mount the aforementioned added circuit on the printed-circuit board utilized for the strobe devices. To overcome the above drawback, referring to FIG. 6 and FIG. 7, a configuration, in which a separate printed-circuit board, mounting the added circuit, is coupled to the printed-circuit board for strobe lighting, will be described in the following.

Figure 6:
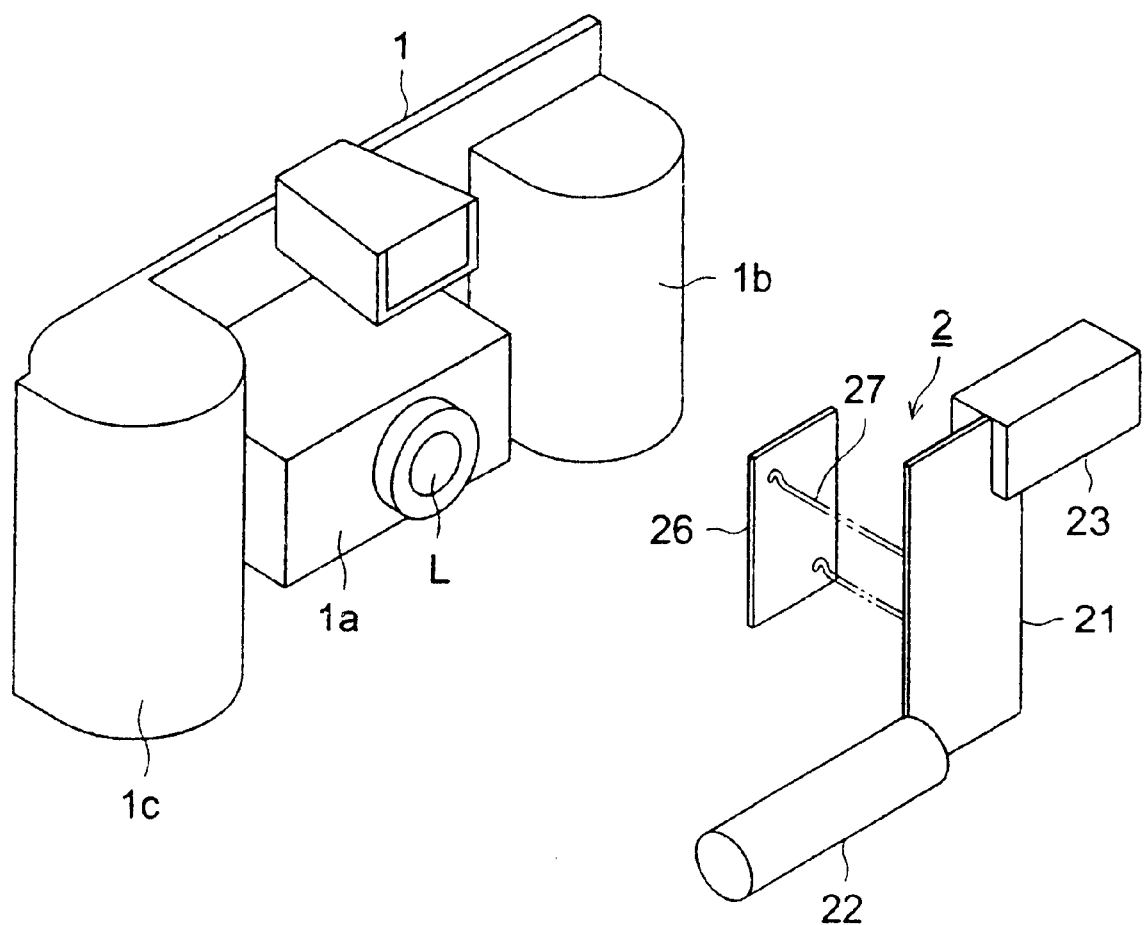
FIG. 6 shows a perspective view of a main body of the lens-fitted film unit.
Figure 7:
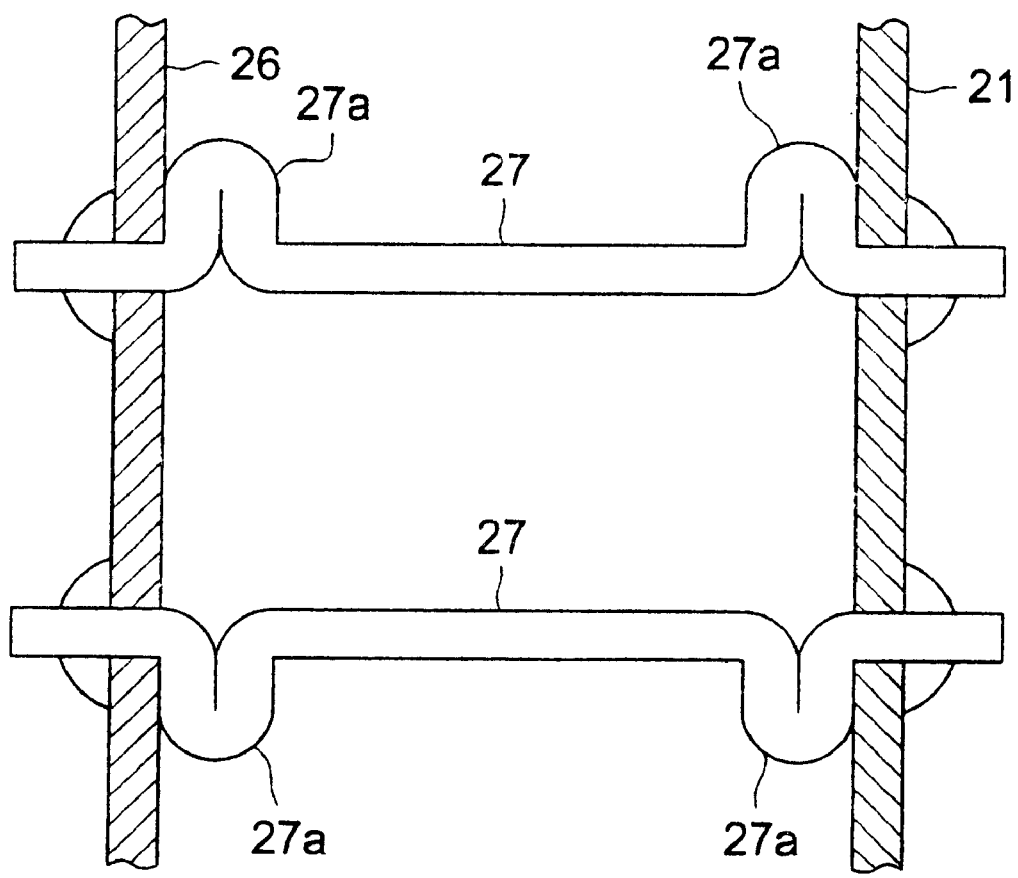
FIG. 7 shows an enlarged cross-sectional view of two printed-circuit boards coupled to each other.

FIG. 6 shows a perspective view of a main body of the lens-fitted film unit, while FIG. 7 shows an enlarged cross-sectional view of two printed-circuit boards coupled to each other.

In FIG. 6, numeral 1 indicates a main body incorporating various kinds of photographic mechanisms. Numeral 1a indicates an exposing section, which holds photographic lens L, and includes a shutter mechanism (not shown in the drawings) to expose images on a non-exposed film loaded interior main body 1 by means of a shutter release mechanism. Numeral 1b indicates a film rolling chamber, in which a non-exposed film roll is mounted, while Numeral 1c indicates a film cartridge chamber, which includes a film cartridge, and winds a exposed film into the film cartridge by means of a winding mechanism (not shown in the drawings).

Figure 1:
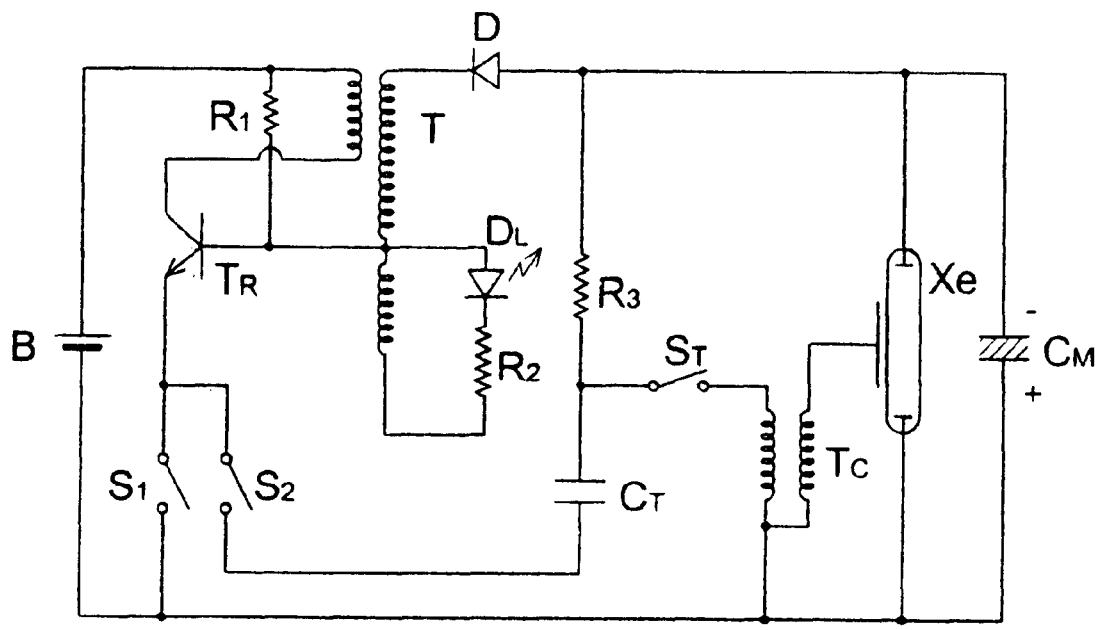
FIG. 1 shows an example of the strobe circuit diagram employed for conventional lens-fitted film units.

Numeral 2 indicates a strobe unit, while Numeral 21 indicates a first printed-circuit board on which parts, constituting the fundamental strobe circuit as shown in FIG. 1, are mounted, and main-capacitor 22, having a large dimension, is also attached. In addition, strobe lighting section 23 is also fixed on the first printed-circuit board 21.

Numeral 26 indicates a second printed-circuit board on which parts, constituting one of the aforementioned added circuits, are mounted. Second printed-circuit board 26 is coupled to first printed-circuit board 21 by means of at least two conductive members 27 having conductivity.

Strobe unit 2 is attached to main body 1 in a manner such that first printed-circuit board 21 is arranged between exposing section 1a and film rolling chamber 1b, and main-capacitor 22 is arranged below exposing section 1a, and strobe lighting section 23 is arranged at upper side of film rolling chamber 1b. Incidentally, since there is a relatively large vacant space between exposing section 1a and film rolling chamber 1b, second printed-circuit board 26 is also arranged at this space.

As shown in FIG. 7, conductive member 27, which connects first printed-circuit board 21 and second printed-circuit board 26 each other, can be formed in such a manner that two parts of a wire is bended to form stopper sections 27a, and both edges of the wire are soldered to connect both printed-circuit boards. Since each of the soldering positions is located at a part of conductive circuit pattern, it is possible to electrically connect first printed-circuit board 21 to second printed-circuit board 26 by means of conductive members 27, number of which are equivalent to number of electrical connections necessary between them. At the same time, it is also possible to mechanically hold first printed-circuit board 21 and second printed-circuit board 26 with a predetermined space by means of conductive members 27.

As a matter of course, a bar-type axial material, having conductivity, can be also employed for conductive members 27, instead of the wire material.

Further, the arrangement of second printed-circuit board 26 is not limited to the position between exposing section 1a and film rolling chamber 1b, but it is also possible to arrange it at such a position being backside of strobe lighting section 23 and in the upper space of film rolling chamber 1b.

Still further, second printed-circuit board 26 is not necessary in parallel with first printed-circuit board 21, but it is also applicable that, for instance, second printed-circuit board 26 is coupled to first printed-circuit board 21 in an orthogonal direction.

[The Third Embodiment]

In the third embodiment, an added printed-circuit board, on which parts for one of various kinds of added circuits are mounted, can be attached to the strobe circuit board provided with fundamental circuits for strobe lighting, to provide such strobe units as a light-intensity regulating strobe unit which can vary an amount of strobe light by stopping the illuminating action in mid-course of strobe lighting corresponding to the object distance, an automatic charge-stopping strobe unit which can automatically stops charging action when completing the charge of the capacitor, and an automatic illuminating strobe unit which automatically emits strobe light only when the luminance of the subject is lower than the predetermined luminance.

Figure 9:
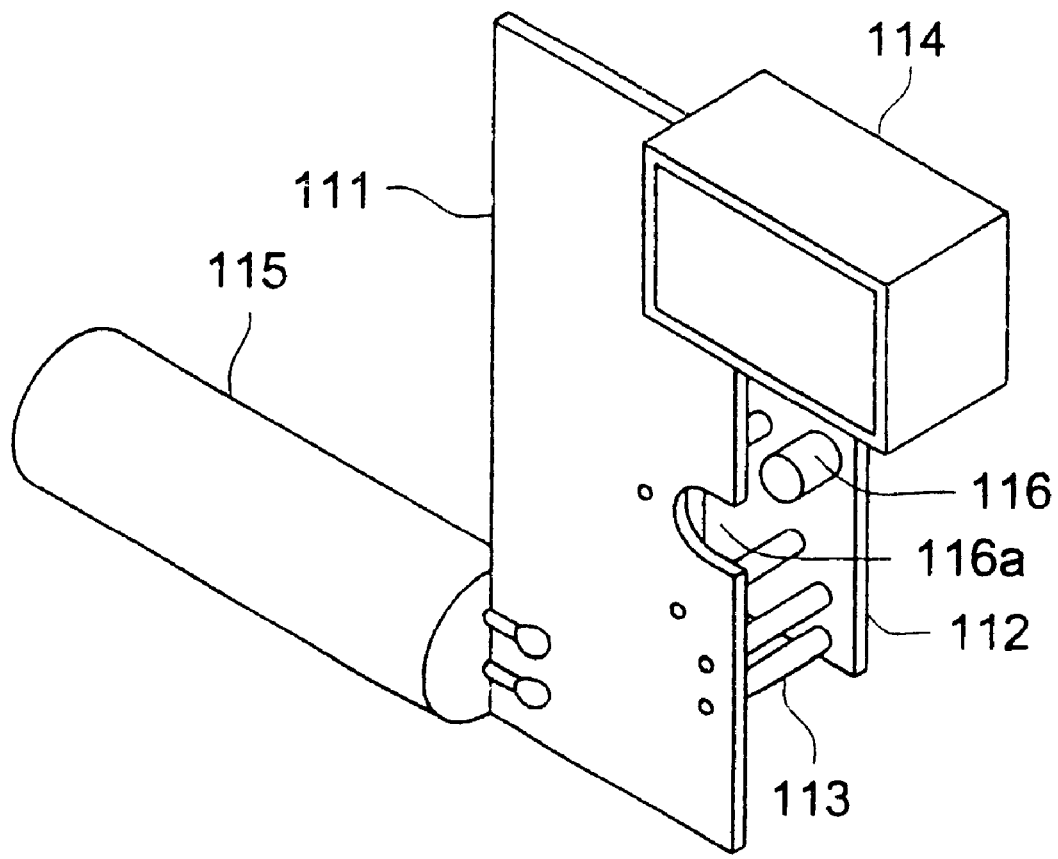
FIG. 9 shows a perspective view of a strobe unit, viewing from front side.
Figure 10:
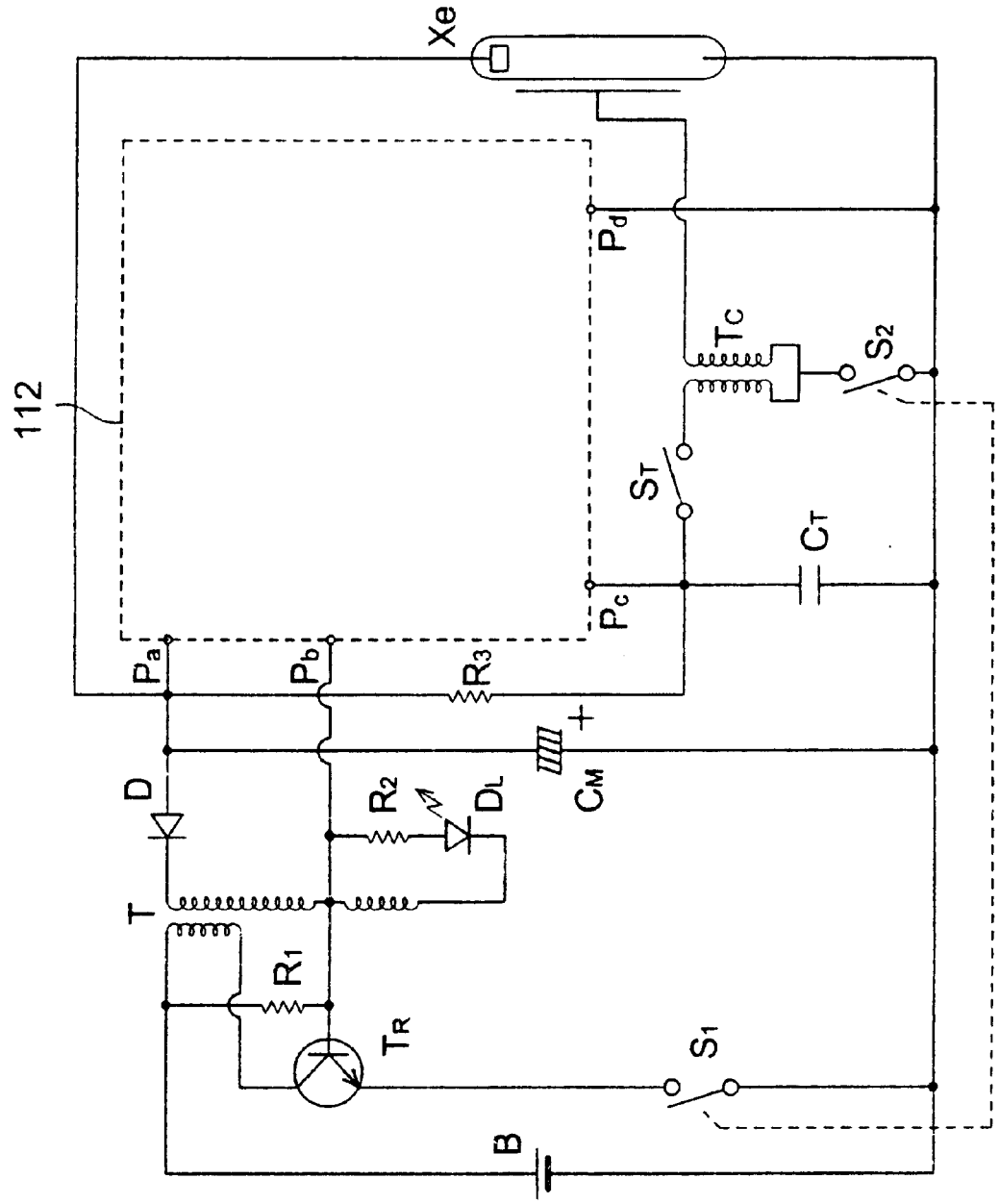
FIG. 10 shows a fundamental circuit-diagram of a strobe unit.
Figure 11:
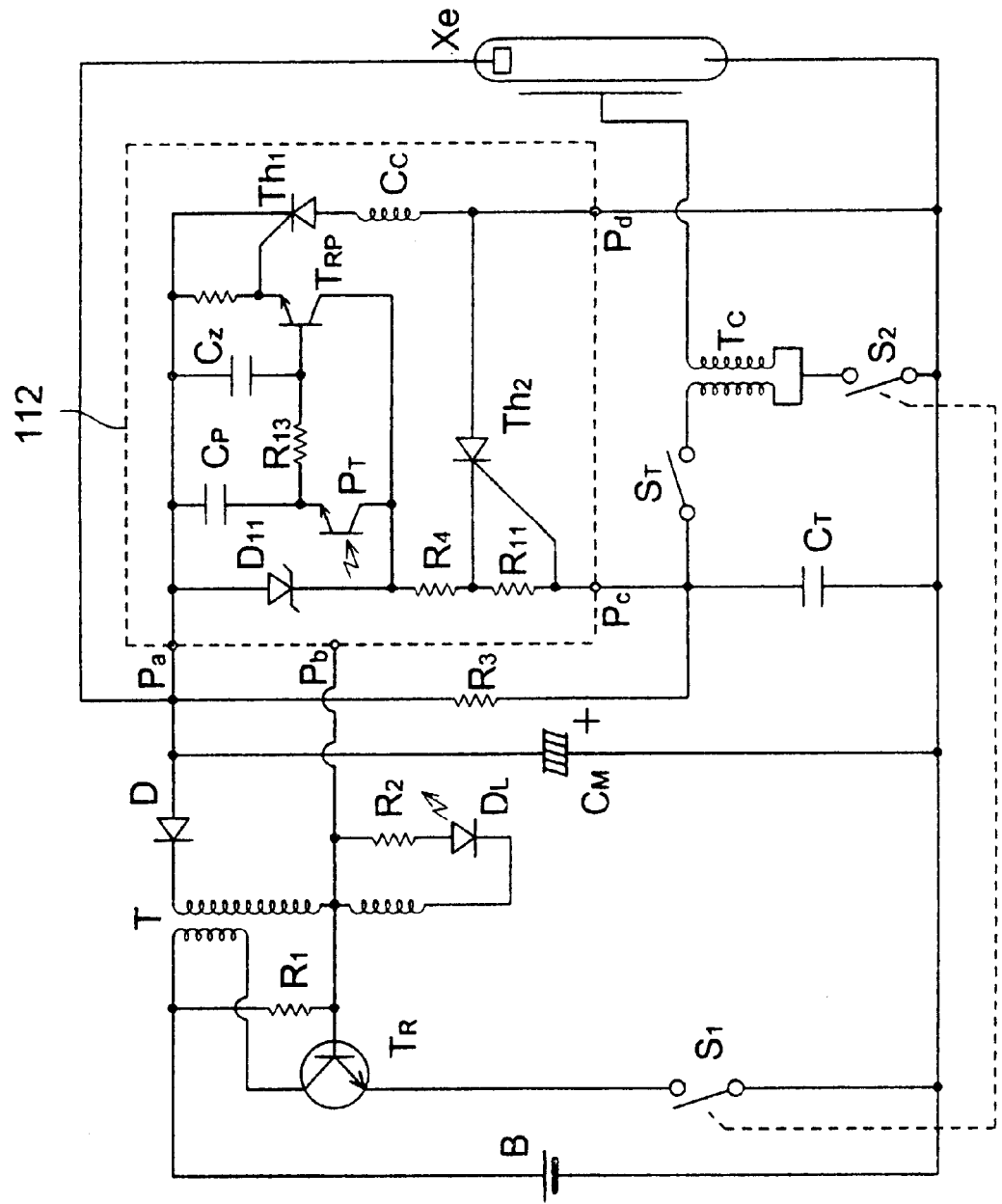
FIG. 11 shows a circuit-diagram of a strobe unit added with a circuit for regulating a light-intensity of the strobe light.
Figure 12:
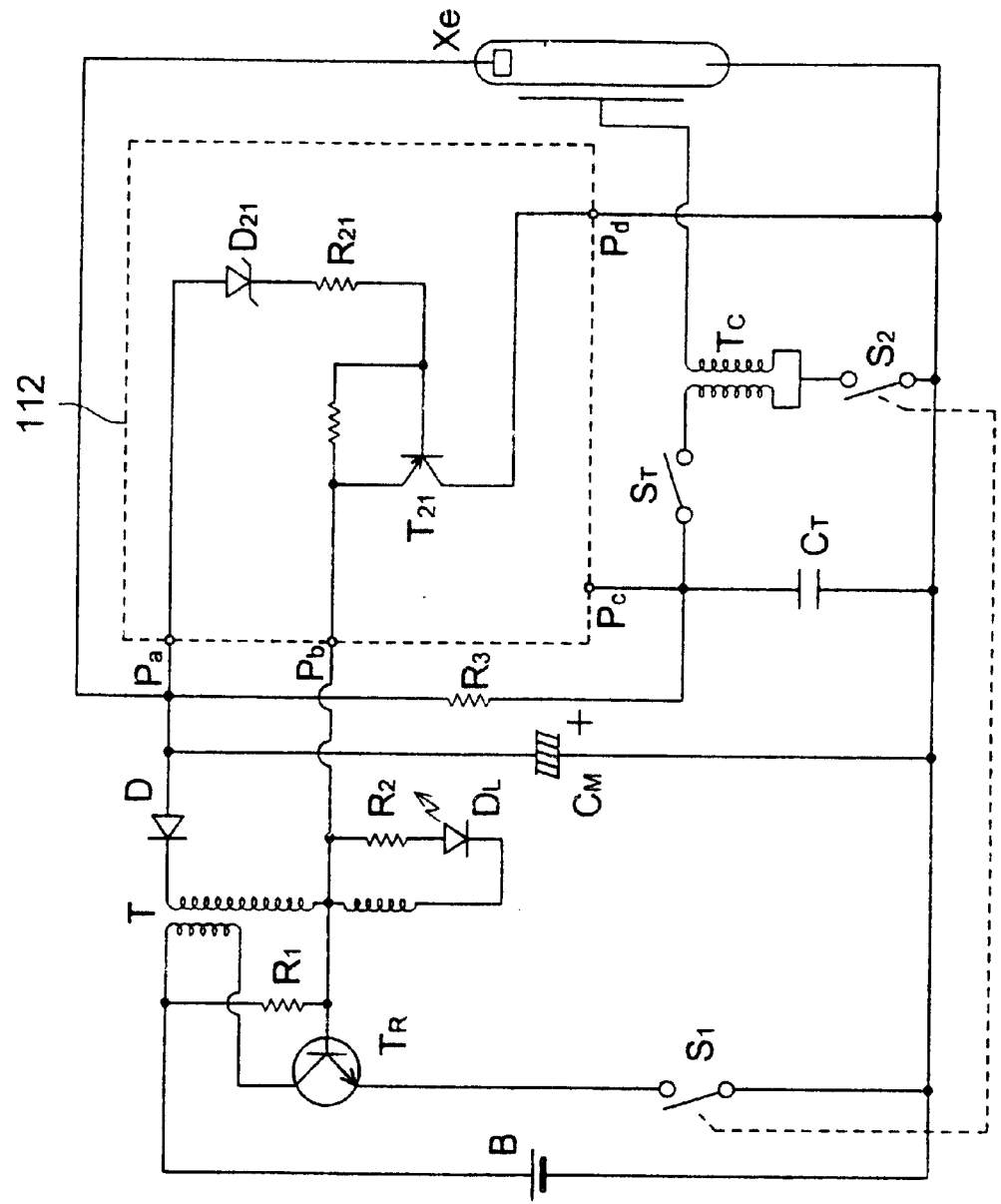
FIG. 12 shows a circuit-diagram of a strobe unit added with a circuit for automatically stopping the charging action.
Figure 13:
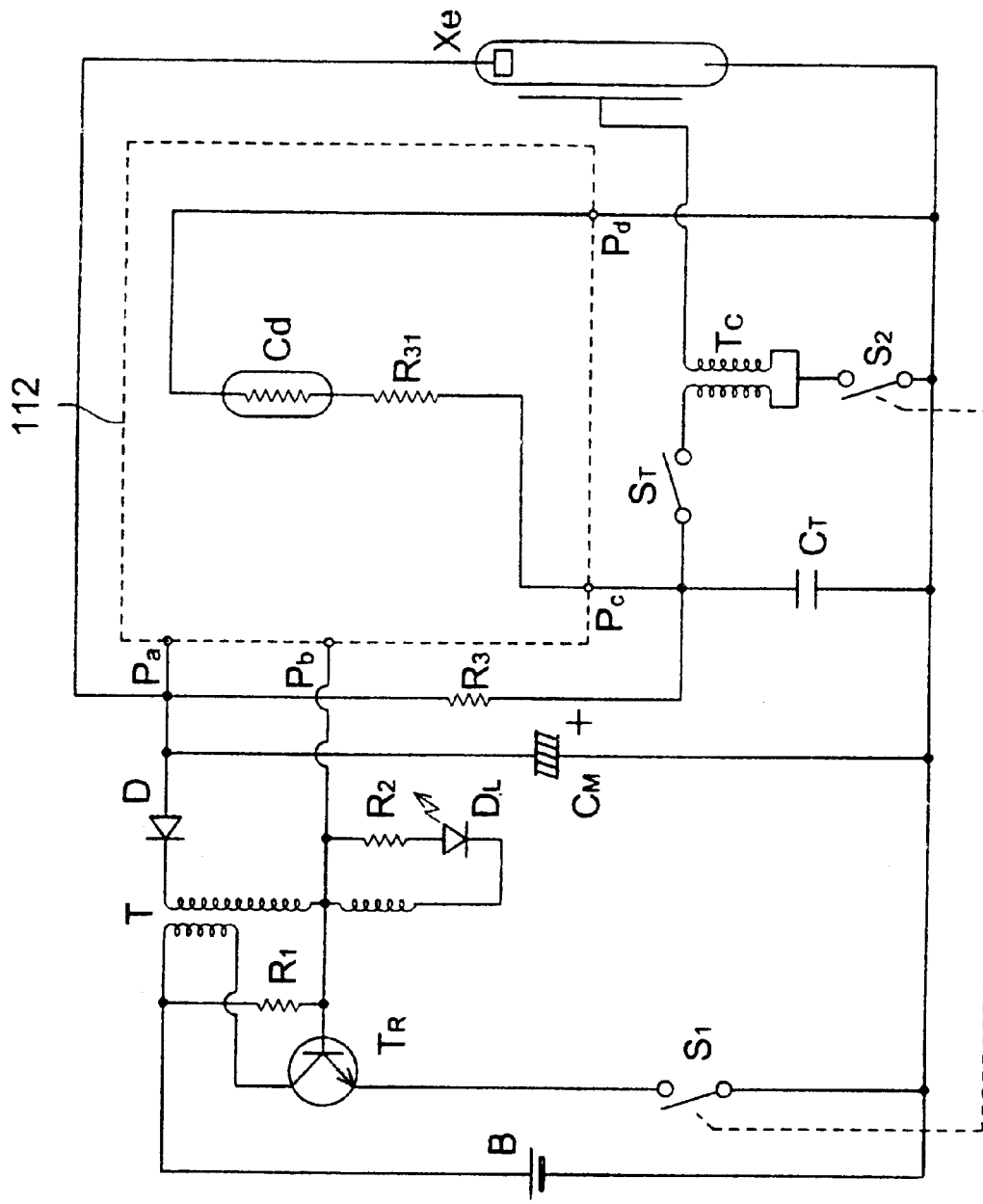
FIG. 13 shows a circuit-diagram of a strobe unit added with a circuit for automatically emitting strobe light.

Referring to FIG. 9–FIG. 13, such strobe units are detailed in the following. FIG. 9 shows a perspective view of a strobe unit, viewing from front side; FIG. 10 shows a fundamental circuit-diagram of a strobe unit; FIG. 11 shows a circuit-diagram of a strobe unit added with a circuit for regulating a light-intensity of the strobe light; FIG. 12 shows a circuit-diagram of a strobe unit added with a circuit for automatically stopping the charging action; and FIG. 13 shows a circuit-diagram of a strobe unit added with a circuit for automatically emitting strobe light.

In the strobe unit shown in FIG. 9, numeral 111 indicates a printed-circuit board for strobe lighting, on which a voltage-boosting circuit, utilized for boosting up the voltage of power source, and fundamental parts, utilized for the illumination circuit to start the illumination of the discharge tube, are mounted. At the backside of printed-circuit board 111, added printed-circuit board 112, on which parts, utilized for added circuit (to be detailed later), are mounted, is supported by means of four connecting members 113, having conductivity. Numeral 114 indicates an illuminating section, which includes a discharge tube, a reflector, a strobe panel, etc., and is attached to printed-circuit board 111. Numeral 115 indicates a main-capacitor, mounted on printed-circuit board 111 by means of two lead wires.

Incidentally, bar materials, wires, plate materials, and etc. can be employed for connecting members 113, as far as such materials can mechanically support added printed-circuit board 112 and are conductive between both conductive printed-patterns as needed.

Further, photo-receiving element 116 is mounted on added printed-circuit board 112 as needed, and notch 16a, through which a light beam enters into photo-receiving element 116, is formed in printed circuit board 111.

Still further, added printed-circuit board 112 is not necessary in parallel with printed-circuit board 111, but it is also applicable that, for instance, added printed-circuit board 112 is coupled to printed-circuit board 111 in an orthogonal direction or etc. In the above case, however, connecting members 113 would be formed in a bended-shape and/or the edge sidewall portion of connecting members 113 would be attached to added printed-circuit board 112.

Still further, a hard printed circuit board made of paper-phenol resin or grass-epoxy resin can be employed for both printed-circuit board-111 and added printed-circuit board 112, and a flexible printed circuit board made of polyester resin also can be employed as well.

Next, referring to FIG. 10, the fundamental circuit for strobe lighting will be detailed in the following.

When main-switch $S_1$ is turned ON by an external operation-and illumination-prohibiting switch $S_2$ is also turned ON in conjunction with main-switch $S_1$, the electronic current, fed from battery B, flows into transistor $T_R$ through resistor $R_1$ to start the oscillation, by which the high-voltage of 300–350 volts is induced at the secondary winding of oscillation transformer T. The induced electronic current from the secondary winding is rectified by diode D, and the rectified electronic current flows into main-capacitor $C_M$ and trigger-capacitor $C_T$, serially connected with resistor $R_1$, to charge them. When main-capacitor $C_M$ is charged to a predetermined voltage, light-emitting diode $D_L$, serially connected with resistor $R_2$, emits light.

When capturing image, trigger-switch $S_T$ turns ON in conjunction with the opening operation of shutter blinds. Then, the closed circuit, serially connecting trigger-capacitor $C_T$, trigger-switch $S_T$, the primary winding of trigger-transformer $T_C$ and illumination-prohibiting switch $S_2$, is formed, to discharge the electronic charge, stored in trigger-capacitor $C_T$, into the primary winding of trigger-transformer $T_C$. As a result, the further high-voltage is induced in the secondary winding of trigger-transformer $T_C$, and the induced high-voltage is applied to the trigger-electrode of discharge tube Xe, in which electrons, isolated from the cathode, impinge with ionized xenon atoms to excite the xenon atoms. Thus, discharge tube Xe emits the strobe light associating with the discharging action of main-capacitor $C_M$.

The abovementioned circuits are mounted in printed circuit board 111, and symbols Pa, Pb, Pc and Pd indicate connecting ports for connecting it to added printed-circuit board 112 by means of connecting members 113. Connecting ports Pa, Pb, Pc and Pd are coupled to the negative electrode of main-capacitor $C_M$, the base of transistor $T_R$, the connecting point of capacitor $C_T$ and resistor $R_3$, and the positive electrode of main-capacitor $C_M$, respectively.

Incidentally, since the fundamental circuit for strobe lighting can sufficiently work only within printed circuit board 111, as aforementioned, added printed-circuit board 112 and connecting members 113 are excluded from the simplest strobe unit, and nothing is coupled to ports Pa, Pb, Pc and Pd, as shown in FIG. 10.

Next, referring to FIG. 11, the circuit diagram, added with a light-intensity regulating circuit, will be detailed in the following. The embodiment, shown in FIG. 11, is an example in which the zener diode is employed as the operating means. In FIG. 11, the parts, constituting the light-intensity regulating circuit, are mounted on light-intensity regulating circuit board 112. When trigger-switch $S_T$ turns ON, a part of electronic charge, stored in main-capacitor $C_M$, flows into resistor $R_{11}$, which is coupled to port Pc, through the primary winding of trigger-transformer $T_C$ and trigger-switch $S_T$, resulting in electronic current $i_1$. Further, after trigger-capacitor $C_T$ is discharged, a part of electronic charge, stored in main-capacitor $C_M$, also flows into resistor $R_{11}$, so as to charge trigger-capacitor $C_T$, resulting in electronic current $i_2$. In the above embodiment, since the anode of zener diode $D_{11}$ is coupled to the negative pole of main-capacitor $C_M$ and the cathode of zener diode $D_{11}$ is serially coupled to resistors $R_{11}$, $R_4$, electronic current $i_0$, which is equal to $i_1+i_2$, flows into zener diode $D_{11}$.

Capacitor $C_P$ is serially coupled to phototransistor $P_T$, and zener diode $D_{11}$, the anode of which is coupled to port Pa, is coupled to them in parallel. Phototransistor $P_T$, which is equivalent to photo-receiving element 116 shown in FIG. 9, receives a light reflected from the subject. The connected point of capacitor $C_P$ and phototransistor Ph is coupled to the base of transistor $T_{RP}$ with resistor $R_{13}$, while the emitter of transistor $T_{RP}$ is coupled to the gate of thyristor $Th_1$. Thyristor $Th_1$ is serially coupled to choke-coil $C_C$, one end of which is coupled to port Pd, and discharge tube Xe is coupled to them in parallel.

Accordingly, when thyristor $Th_1$ turns ON, the electronic charge stored in main-capacitor $C_M$ rushes into choke-coil $C_C$ with an electronic current far greater than that of flowing into discharge tube Xe to consume the electronic charge in choke-coil $C_C$, resulting in deactivation of the illumination of discharge tube Xe.

When a zener voltage is generated between both terminals of zener diode $D_{11}$ by electronic current $i_0$ flowing into zener diode $D_{11}$, an electronic current, corresponding to the intensity of light reflected from the subject, flows in phototransistor $P_T$. When the subject is near the strobe device, the intensity of light reflected from the subject becomes large value, and thereby, a large amount of electronic current flows in phototransistor $P_T$. As a result, capacitor $C_P$ is rapidly charged. On the other hand, when the subject is far from the strobe device, the intensity of light reflected from the subject becomes small value, and thereby, a small amount of electronic current flows in phototransistor $P_T$. As a result, capacitor $C_P$ is slowly charged.

Accordingly, when capturing the subject located at near distance, since transistor $T_{RP}$ rapidly turns ON to activate thyristor $Th_1$, choke-coil $C_C$ rapidly consumes the electronic charge stored in main-capacitor $C_M$ in mid-course of illuminating action of discharge tube Xe. As a result, the illuminating action of discharge tube Xe is stopped within a shorter luminous duration time. On the other hand, when capturing the subject located at far distance, since transistor $T_{RP}$ slowly turns ON to activate thyristor $Th_1$, the illuminating action of discharge tube Xe is stopped within a longer luminous duration time. Therefore, it is possible to regulate the exposure value within a substantially constant value, irrespective of the object distance, since the intensity of light reflected from the subject varies corresponding to its object distance, and thereby, the total luminous amount of strobe device varies, even if the aperture is fixed.

Thyristor $Th_2$ is inserted between the connecting point of resistors $R_{11}$, $R_4$ and one end of choke-coil $C_C$, so as to prevent instability of the electronic current, due to chattering actions of trigger-switch $S_T$, when it turns ON. In addition, capacitor $C_Z$ is inserted for suppressing trigger noises.

Incidentally, in the abovementioned circuit, nothing is coupled to port Pb.

Next, referring to FIG. 12, a circuit-diagram, in which an automatic charge-stopping circuit is equipped as the added circuit for the fundamental strobe circuit, will be detailed in the following.

In FIG. 12, the automatic charge-stopping circuit is equipped on added printed-circuit board 112. When the charged voltage of main-capacitor $C_M$ reaches the zener-voltage (for instance, 300–350 volts) of zener diode $D_{21}$, anode of which is coupled to port Pa, an electronic current flows into zener diode D21 through the collector of transistor $T_{21}$, which is coupled to port Pd, allowing that transistor $T_{21}$ turns ON. Accordingly, the base voltage of transistor $T_R$ is lowered, resulting in deactivation of the oscillation with transistor $T_R$ and stoppage of the charging action for main-capacitor $C_M$. Incidentally, the emitter of transistor $T_{21}$ is coupled to port Pb, while nothing is coupled to port Pc. Further, in the above embodiment, photo-receiving element 116 is excluded from the circuit.

As mentioned above, since the charging action for main-capacitor $C_M$ is automatically stopped when the charged voltage of it reaches a predetermined voltage, the power dissipation of battery B can be lowered.

Next, referring to FIG. 13, a circuit-diagram, in which an automatic illuminating circuit is equipped as the added circuit for the fundamental strobe circuit, will be detailed in the following. In FIG. 13, the automatic illuminating circuit is equipped on added printed-circuit board 112. In this added circuit, CdS cell Cd, serving as photo-receiving element 116, is serially connected to resistor R31, and one end of CdS cell Cd is coupled to port Pd, while one end of resistor R31 is coupled to port Pc. In addition, nothing is coupled to ports Pa, Pb.

When the luminance of the subject is high, the resistance of CdS cell Cd decreases, allowing increase of the electronic current flowing into CdS cell Cd, so as to discharge the electronic charge stored in trigger-capacitor $C_T$. Accordingly, discharge tube Xe does not emit any light, even when trigger-switch $S_T$ turns ON.

On the other hand, when the luminance of the subject is low, the resistance of CdS cell Cd increases, allowing decrease of the electronic current flowing into CdS cell Cd, so as to maintain the electronic charge stored in trigger-capacitor $C_T$.

Therefore, when the luminance of the subject is high, discharge tube Xe does not emit any light, while discharge tube Xe emits light, when the luminance of the subject is low.

Incidentally, the electronic parts for each of three types of added circuits, described in the above, are mounted on the added printed-circuit board. The scope of the present invention is not limited to the above embodiment. It is also applicable to integrally assemble the electronic parts in a package and to mount the package on the added printed-circuit board.

[The Fourth Embodiment]

In the fourth embodiment, different types of strobe units can be manufactured by interchangeably mounting various kinds of main parts on the printed circuit board, which is already equipped with the fundamental circuit for strobe lighting.

Figure 14:
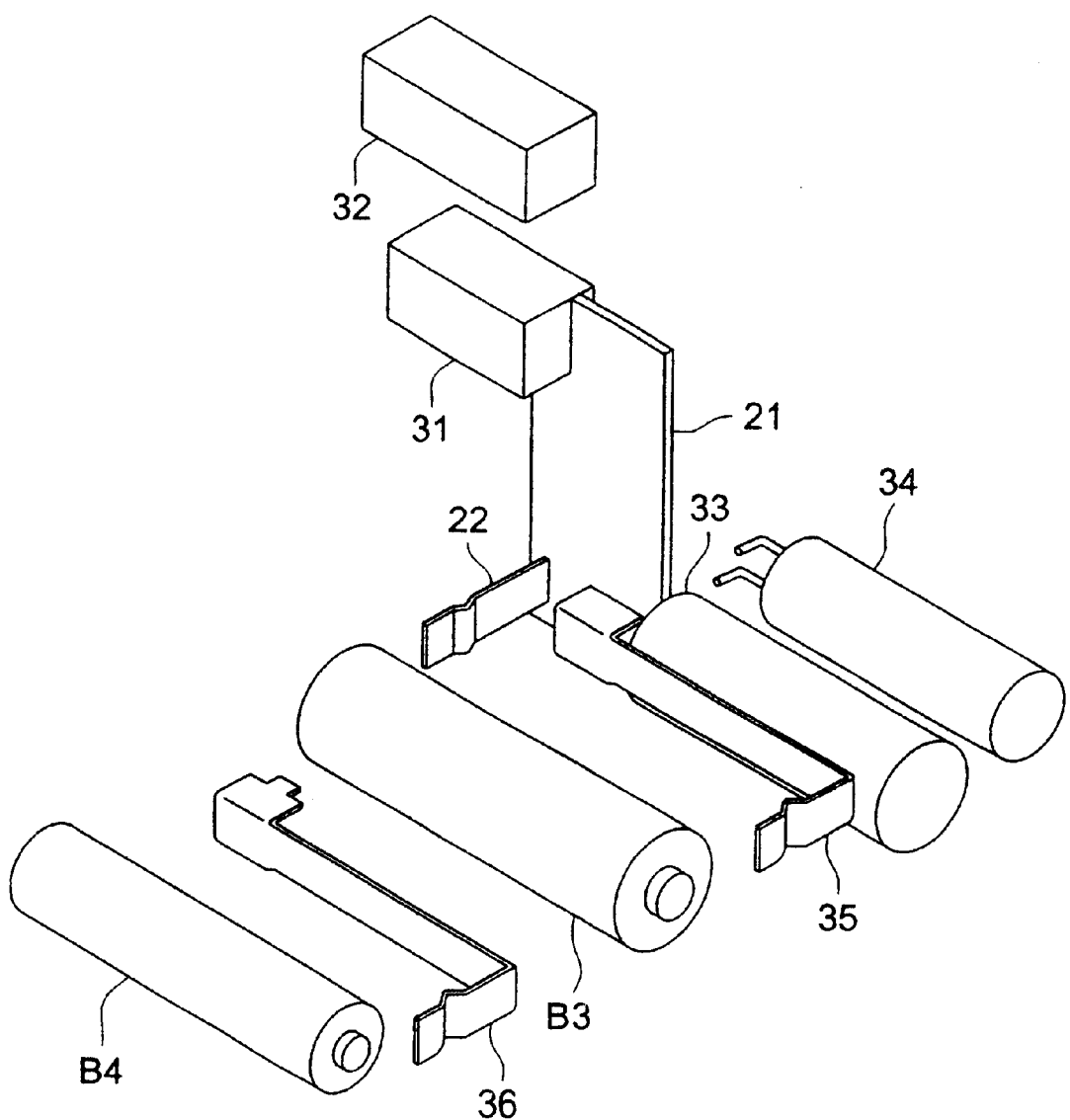
FIG. 14 shows a perspective view of the strobe unit, viewing from backside.

FIG. 14 shows a perspective view of the strobe unit, viewing from backside.

Numeral 21 indicates a printed-circuit board for strobe lighting, on which a voltage-boosting circuit, utilized for boosting up the voltage of power source, and fundamental parts, utilized for the illumination circuit to start the illumination of the discharge tube and etc., are mounted. Numeral 31 indicates a illuminating section, including the discharge tube, the reflector, the strobe panel, etc., the distribution characteristic of luminous intensity of which corresponds to the viewing angle of the standard photographic lens. In addition, illuminating section 31 is attached to printed-circuit board 21.

Sometimes, it is requested to manufacture lens-fitted film units of a new type, introducing a wide-angle lens, merely by changing a minimum number of other parts. For this purpose, it is necessary to change the distribution characteristic of luminous intensity of the illuminating section to that suitable for the wide viewing angle, corresponding to the wide-angle lens employed. To achieve this, illuminating section 32, in which the distribution characteristic of luminous intensity is arranged for the wide viewing angle by changing at least a reflector, is provided in advance, and then, as a replacement of illuminating section 131, illuminating section 32 is attached to printed circuit board 21, corresponding to the wide-angle lens employed. Thus, different types of strobe units can be manufactured in the same production line and process.

Incidentally, the distribution characteristic of luminous intensity, mentioned above, is merely one of various examples. Any kinds of distribution characteristics of luminous intensity are applicable, as far as the distribution characteristic of luminous intensity of illuminating section 31 is different from that of illuminating section 32.

Further, numeral 33 indicates a main-capacitor, which is equipped on printed circuit board 21. It is possible to shorten the charging time of the main-capacitor and/or to reduce the cost of the strobe unit, by employing the main-capacitor having a smaller capacity, when employing a photographic lens having a brighter F-number and/or accommodating a film having a higher sensitivity. For this purpose, as a replacement of main-capacitor 33, the main-capacitor 34, having a capacity smaller than that of main-capacitor 33, is mounted on printed circuit board 21, corresponding to the F-number of the photographic lens and/or the sensitivity of the film. Thus, different types of strobe units can be manufactured in the same production line and process.

Incidentally, although any kinds of capacitors are applicable, as far as each of the capacitors, having different capacities, can be interchangeably mounted on printed circuit board 21, it is desirable that a diameter and a pitch of the two lead wires are coincided between different capacitors, since the two lead wires are inserted into the holes of printed circuit board 21 and fixed on it by soldering process.

Further, numeral 22 indicates a battery-contacting plate for negative pole, while numeral 35 indicates a battery-contacting plate for positive pole, one end of which is fixed on printed circuit board 21. Size AA battery B3 is held between battery-contacting plates 22, 35.

When main-capacitor 34 having a small capacity is equipped on printed circuit board 21, it is possible to employ size AAA battery B4 having a smaller capacity, instead of size AA battery B3. Then, battery-contacting plate 35 can be also replaced by battery contacting plate 36 having a length shorter than that of battery-contacting plate 35 to hold size AAA battery B4 between battery-contacting plates 22, 36. Accordingly, it is possible to change size AA battery B3 to size AAA battery B4 merely by changing battery-contacting plate 35 to battery-contacting plate 36. Thus, different types of strobe units can be manufactured in the same production line and process.

The battery-contacting plate for positive pole, which can hold the size N battery, is also applicable, as needed.

The battery-contacting plate, to be interchangeably mounted, is not necessary that for positive pole. It is also possible that various kinds of battery-contacting plates for negative pole are interchanged as needed, while fixing the battery-contacting plate for positive pole.

The main body, on which the strobe unit, described above, is equipped, may be either a lens-fitted film unit, a conventional camera being possible to change film, or a digital camera.

According to the strobe circuit, embodied in the present invention, it is possible to activate the operating means, added to the strobe circuit, synchronized with the illuminating action of the xenon tube, as well as to reduce a number of parts utilized for the operating means.

Further, according to the strobe circuit, embodied in the present invention, it is possible to activate the operating means, added to the strobe circuit, synchronized with activation of the trigger-switch, as well as to reduce a number of parts utilized for the operating means.

Still further, according to the strobe circuit, the lens-fitted film unit and the camera, embodied in the present invention, it is possible to activate the light-emitting diode, synchronized with activation of the trigger-switch.

Still further, according to the strobe circuit, embodied in the present-invention, it is possible to activate the zener diode, synchronized with activation of the trigger-switch.

Still further, according to the strobe circuit, embodied in the present invention, it is possible to activate the added circuit, using the zener diode as the power source of it.

Still further, according to the strobe circuit, the lens-fitted film unit and the camera, embodied in the present invention, it is possible to activate the light-intensity regulating circuit, using the zener diode as the power source of it.

Still further, according to the strobe circuit, the lens-fitted film unit and the camera, embodied in the present invention, it is possible to add the circuit to the second printed circuit board, without major modification of the printed circuit board already mounting the fundamental circuit for strobe lighting.

Disclosed embodiment can be varied by a skilled person without departing from the spirit and scope of the invention.

What is claimed is:

1. A strobe device, comprising:
   a strobe light-emitting tube to emit a strobe light;
   a main-capacitor coupled in parallel to said strobe light-emitting tube, so as to supply a luminous energy to said strobe light-emitting tube;
   a trigger-transformer to apply a trigger-voltage to a trigger-electrode of said strobe light-emitting tube;
   a trigger-section to activate a light-emitting action of said strobe light-emitting tube;
   a trigger-capacitor, coupled to said main-capacitor with a resistor, to store an electronic charge, which is discharged to said trigger-transformer when said trigger-section turns ON; and
   a semiconductor element driven by a part of an electronic charge stored in said main-capacitor, when said trigger-section turns ON to activate said light-emitting action of said strobe light-emitting tube,
   wherein said semiconductor element is a zener diode serving as a constant-voltage generating element, and wherein an anode of said zener diode is coupled to a negative pole of said main-capacitor.

2. The strobe device of claim 1 wherein a second circuit, which is driven by a voltage-source generated by said constant-voltage generating element, is coupled in parallel to said constant-voltage generating element.

3. The strobe device of claim 2,
   wherein said second circuit is a light-intensity regulating circuit, which controls an amount of said strobe light emitted from said strobe device, in response to an amount of said strobe light reflected from a subject.

4. The strobe device of claim 3, further comprising:
   a first printed circuit board on which electronic parts, constituting a fundamental circuit for a strobe lighting, including at least a voltage-boosting circuit, a charging circuit and a illumination circuit, are mounted; and
   a second printed circuit board on which electronic parts, constituting an electronic circuit other than said fundamental circuit, are mounted, wherein said first printed circuit board and said second printed circuit board are coupled to each other by means of a conductive member having an electronic conductivity, and said light-intensity regulating circuit is equipped on said second printed circuit board.

5. The strobe device of claim 4,
   wherein said first printed circuit board and said second printed circuit board are coupled to each other by means of at least said two conductive members.

6. The strobe device of claim 1,
   wherein said semiconductor element is a light-emitting diode.

7. The strobe device of claim 6,
   wherein a cathode of said light-emitting diode is coupled to a negative pole of said main-capacitor.

8. The strobe device of claim 1,
   wherein a closed circuit, serially connecting said trigger-capacitor, said trigger-section and a primary winding of said trigger-transformer, is formed when said trigger-section turns ON, and simultaneously, another closed circuit, serially connecting said main-capacitor, said zener diode, said resistor, said trigger-section and said primary winding of said trigger-transformer, is formed.

9. A lens-fitted film unit, comprising:
   a main-body;
   a photographic lens;
   a shutter; and
   a photographic film loaded in said main-body, wherein said strobe device comprises,
   a strobe light-emitting tube to emit a strobe light;
   a main-capacitor coupled in parallel to said strobe light-emitting tube, so as to supply a luminous energy to said strobe light-emitting tube;
   a trigger-transformer to apply a trigger-voltage to a trigger-electrode of said strobe light-emitting tube;

a trigger-section to activate a light-emitting action of said strobe light-emitting tube;

a trigger-capacitor, coupled to said main-capacitor with a resistor, to store an electronic charge, which is discharged to said trigger-transformer when said trigger-section turns ON; and a semiconductor element driven by a part of an electronic charge stored in said main-capacitor, when said trigger-section turns ON to activate said light-emitting action of said strobe light-emitting tube, wherein said semiconductor element is a light-emitting diode, which exposes a mark on a film loaded into said lens-fitted film unit.

10. The lens-fitted film unit of claim 9, further comprising:

a power source to supply an electronic power to said strobe device, said power source is a battery of 1–2 volt.

11. The lens-fitted film unit of claim 9, wherein said trigger-section turns ON in conjunction with an opening action of said shutter.

12. A camera, comprising:

a photographic lens; and a shutter, wherein said strobe device comprises, a strobe light-emitting tube to emit a strobe light;

a main-capacitor coupled in parallel to said strobe light-emitting tube, so as to supply a luminous energy to said strobe light-emitting tube;

a trigger-transformer to apply a trigger-voltage to a trigger-electrode of said strobe light-emitting tube;

a trigger-section to activate a light-emitting action of said strobe light-emitting tube;

a trigger-capacitor, coupled to said main-capacitor with a resistor, to store an electronic charge, which is discharged to said trigger-transformer when said trigger-section turns ON; and a semiconductor element driven by a part of an electronic charge stored in said main-capacitor, when said trigger-section turns ON to activate said light-emitting action of said strobe light-emitting tube, wherein said semiconductor element is a light-emitting diode, which exposes a mark on a film loaded into said camera.

13. The camera of claim 12, wherein said trigger-section turns ON in conjunction with an opening action of said shutter.

14. A strobe device, comprising:

a strobe light-emitting tube to emit a strobe light;

a main-capacitor coupled in parallel to said strobe light-emitting tube, so as to supply a luminous energy to said strobe light-emitting tube;

a trigger-transformer to apply a trigger-voltage to a trigger-electrode of said strobe light-emitting tube;

a trigger-section to activate a light-emitting action of said strobe light-emitting tube;

a trigger-capacitor, coupled to said main-capacitor with a resistor, to store an electronic charge, which is discharged to said trigger-transformer when said trigger-section turns ON; and an element driven by a part of an electronic charge stored in said main-capacitor, when said trigger-section turns ON to activate said light-emitting action of said strobe light-emitting tube; and a second circuit that is coupled in parallel to said element, wherein said element serves as a voltage-source to drive the second circuit.

15. The strobe device of claim 14, wherein said second circuit is a light-intensity regulating circuit.

* * * * *